UNITED STATES PATENT OFFICE.

HARVEY N. BARRETT, OF BAYBRIDGE, OHIO, ASSIGNOR TO MEDUSA CONCRETE WATER-PROOFING COMPANY, OF SANDUSKY, OHIO, A CORPORATION OF OHIO.

MANUFACTURE OF INSOLUBLE LIME SALTS OF FATTY ACIDS.

No. 898,547.   Specification of Letters Patent.   Patented Sept. 15, 1908.

Application filed August 14, 1907. Serial No. 388,522.

To all whom it may concern:

Be it known that I, HARVEY N. BARRETT, a citizen of the United States, and resident of Baybridge, in the county of Erie and State of Ohio, have invented certain new and useful Improvements in the Manufacture of Insoluble Lime Salts of Fatty Acids, of which the following is a specification.

In Letters Patent No. 851,247, granted to Spencer B. Newberry, April 23, 1907, there is described a process of rendering cement waterproof by mixing therewith a small percentage of the insoluble lime salt of a fatty acid. In the specification of this patent are also described two methods of making the insoluble lime salt, or stearate of lime, as it is called.

The present invention relates to an improved process of manufacturing stearate of lime suitable for rendering cement waterproof according to the process of said patent.

In practice it has hitherto been customary in preparing stearate of lime, or insoluble lime salt, for waterproofing cement, to make use of free fatty acids obtained from animal or vegetable fats or oils by known methods and to convert these into the lime compound by heating with lime, with or without the presence of water. I have discovered a simple and practical method of making the desired lime salt of fatty acids, or stearate of lime, or generally speaking lime soap direct from fats or oils, which method consists broadly in heating the mixture of animal or vegetable oil or fat and slaked or hydrate lime to a temperature above the boiling point of water, and preferably to about four hundred degrees F., in a suitable vat or vessel. When this mixture is thus heated a strong reaction takes place, the fatty acids combine with the lime to form the desired lime salt and the glycerin and water set free are rapidly volatilized and expelled.

As a specific instance I take any suitable animal or vegetable oil or fat, preferably tallow, all of which I include under the term fatty matter and melt it in a vat, raising its temperature to, preferably, four hundred to four hundred and forty degrees F. I then add a quantity of slaked or hydrate lime equal to from twelve to twenty per cent. of the weight of the fat or oil. The mixture is then stirred thoroughly until the reaction has subsided and the expulsion of volatile matter practically ceased, which takes from a few minutes to an hour, according to the quantity of material employed. The lime salt of the fatty acids remains in the vat in the form of a semi-fused mass which on cooling congeals to a brittle substance which may be readily ground to fine powder, which powder is adapted for use in waterproofing cement by the process described in the Newberry patent. In place of slaked or hydrate lime, quicklime may be used, but slaked lime is preferable, as the water contained therein aids in expelling the glycerin set free in the reaction.

What I claim and desire to secure by Letters Patent is:—

1. The method of making lime soap, which consists in mixing a quantity of fatty matter with from 12 to 20 per cent., by weight, of slaked or hydrate lime and heating the mixture to approximately 400 degrees F. until the reaction has subsided and substances volatile at this temperature have been expelled.

2. The method of making lime soap, which consists in mixing a quantity of fatty matter with from 12 to 20 per cent., by weight, of slaked or hydrate lime and heating the mixture to approximately 400 degrees F. until the reaction has subsided and the water and glycerin present in the mass have been expelled.

In testimony whereof I affix my signature in presence of two witnesses.

HARVEY N. BARRETT.

Witnesses:
SPENCER B. NEWBERRY,
H. A. DUNKEL.